(12) United States Patent
Chang et al.

(10) Patent No.: US 8,071,206 B1
(45) Date of Patent: ***Dec. 6, 2011

(54) BLAST ENERGY MITIGATING COMPOSITE

(75) Inventors: Susan C. Chang, Canonsburg, PA (US); Douglas J. Merriman, Wheeling, WV (US); Jesse M. Blacker, Bridgeport, OH (US); Rick D. Lucas, St. Clairsville, OH (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 689 days.

This patent is subject to a terminal disclaimer.

(21) Appl. No.: 12/135,154

(22) Filed: Jun. 7, 2008

Related U.S. Application Data

(63) Continuation-in-part of application No. 11/165,580, filed on Aug. 12, 2005, now Pat. No. 7,736,729.

(60) Provisional application No. 60/942,916, filed on Jun. 8, 2007.

(51) Int. Cl.
*B32B 3/26* (2006.01)
*B32B 3/00* (2006.01)
*B32B 9/00* (2006.01)

(52) U.S. Cl. ............... 428/304.4; 428/316.6; 428/318.4

(58) Field of Classification Search ............... 428/304.4, 428/316.8, 318.4, 316.6
See application file for complete search history.

(56) References Cited

U.S. PATENT DOCUMENTS

| | | |
|---|---|---|
| 5,888,469 A | 3/1999 | Stiller |
| 6,112,931 A | 9/2000 | Booth |
| 2004/0107827 A1 | 6/2004 | Edberg |

*Primary Examiner* — Victor Chang
(74) *Attorney, Agent, or Firm* — Philip D. Lane

(57) ABSTRACT

A blast energy mitigating composite useful for protecting a surface or an object from a blast, shock waves, or stress waves caused by a sudden, violent release of energy is described. Certain configurations of the blast energy mitigating composite may include energy mitigating units contained in an energy mitigating matrix. If desired, various reinforcement layers may be incorporated on or within the energy mitigating composite. The energy mitigating units may comprise a porous energy mitigating material such as carbon foam.

48 Claims, 6 Drawing Sheets

BLAST ENERGY MITIGATING COMPOSITE

CROSS-REFERENCE TO RELATED APPLICATIONS

This application claims priority to and is a continuation-in-part of U.S. patent application Ser. No. 11/165,580 filed on Aug. 12, 2005, now U.S. Pat. No. 7,736,729, herein specifically incorporated by reference in its entirety. This application claims priority to and is a non-provisional of U.S. Provisional Patent Application No. 60/942,916 filed on Jun. 8, 2007 herein specifically incorporated by reference in its entirety.

DETAILED DESCRIPTION OF THE INVENTION

A blast energy mitigating composite useful for protecting a surface or an object from a blast, shock waves, or stress waves caused by a sudden, violent release of energy is described. Certain configurations of the blast energy mitigating composite may also be useful for reducing the possibility of a sympathetic detonation. As used in herein, "mitigate" and other variants of the word "mitigate" refer to the reduction of blast wave energy through any mechanism in which the blast wave energy is lessened or reduced, including but not limited to, energy absorption, attenuation, diffusion, dissipation, or the like.

Figure 1:
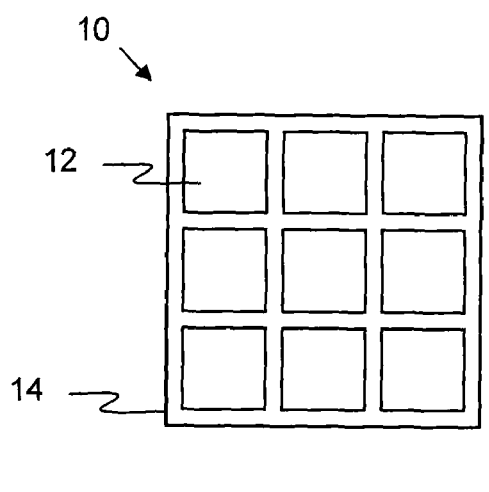
FIG. 1 is a diagrammatic view of an embodiment of a blast energy mitigating composite.
Figure 2:
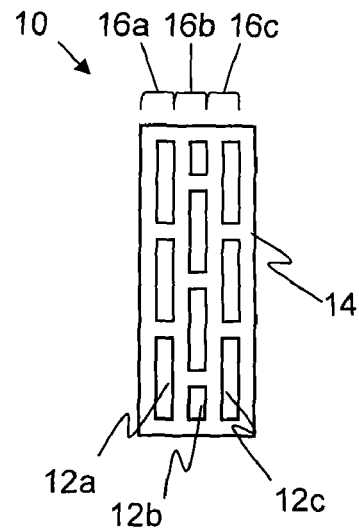
FIG. 2 is a cross-sectional diagrammatic view of the blast energy mitigating composite of FIG. 1.
Figure 3:
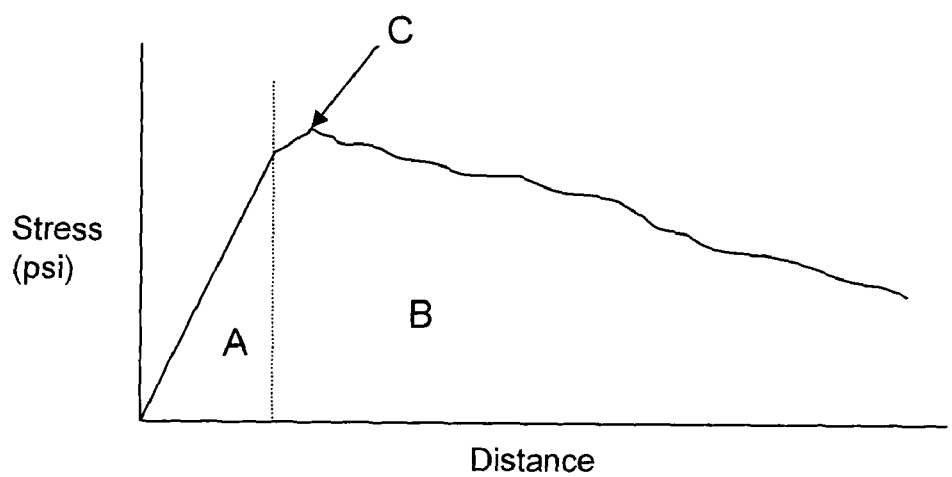
FIG. 3 is a stress-displacement plot showing the results of a compressive strength test for an embodiment of an energy mitigating material.

With reference to FIG. 1 there is shown an embodiment of a blast energy mitigating composite in the form of a panel 10. As discussed in more detail below, the shape of the blast energy mitigating composite is not limited to a panel and can be configured into a wide variety of shapes and configurations. For aid in introducing certain concepts of the blast energy mitigating composite, FIGS. 1, 2, and 3 illustrate embodiments of blast energy mitigating composites as an approximately square panel. The panel 10 comprises an energy mitigating material which may be provided as any number of predetermined geometric shapes, each geometric shape providing an energy mitigating unit 12. In FIG. 1, the geometric shape of the energy mitigating unit 12 is illustrated as a rectangular block. An energy mitigating matrix 14 surrounds, or otherwise encapsulates each of the energy mitigating units 12. Alternatively, the energy mitigating matrix 14 may at least partially surround the energy mitigating units 12.

In FIG. 2, a cross-sectional diagrammatic view of the panel 10 of FIG. 1 is illustrated. As shown in FIG. 2, the energy mitigating units 12a, 12b, and 12c may be arranged in one or more layers, such as shown by layers 16a, 16b, and 16c in the panel 10.

The energy mitigating material, comprising the energy mitigating units 12, is able to mitigate a significant amount of the energy generated from a blast by consuming the blast energy as work to the energy mitigating composite. Such consumption may be accomplished by changing the physical structure of the energy mitigating unit. For example and without intending to be bound by theory, the blast energy may be mitigated by a mechanism in which the energy mitigating unit is progressively crushed as the blast energy is absorbed or dissipated.

The progressive crushing of the energy mitigating units may be realized by selecting an energy mitigating material that is porous and exhibits relatively uniform pore sizes. In some embodiments, the pore sizes may have values ranging from about 50 μm to about 2 mm.

Another consideration for the energy mitigating material is the ability of the energy mitigating material to absorb energy. With reference to FIG. 3, there is shown a stress-displacement profile resulting from a non-confined compressive strength test for one embodiment of an energy mitigating material. The non-confined compressive strength test measures the amount of compressive load a sample can bear prior to failure, during failure, and after the material begins to fail. Referring to FIG. 3, as the compressive load is applied to the energy mitigating material, the energy mitigating material produces a stress-displacement region A, herein referred to as an "initial energy mitigation region." The initial energy mitigation region A represents the amount of compressive load (stress) received by the energy mitigating material before the material begins to fail. In some, but not all embodiments, the initial energy mitigation region A will be bound by a linear or relatively linear stress-strain curve. Once the energy mitigating material begins to fail, in some embodiments, a second region B, herein referred to as a "secondary energy mitigation region," may be produced. The secondary energy mitigation region B is bound by a stress-displacement curve that generally reflects progressively applied compressive load values. The secondary energy mitigation region B represents the amount of energy the energy mitigating material is able to absorb as the physical structure of energy mitigating material fails. The energy mitigating material may include, but is not limited to, a material that is able to absorb energy beyond the initial energy mitigation region. In certain embodiments, the energy mitigating material is able to absorb at least as much energy in the secondary energy mitigation region as was absorbed in the initial energy mitigation region. In other embodiments, the energy mitigating material may absorb about 150% to about 1000% more energy in the secondary energy mitigation region than in the initial energy mitigation region. In some embodiments, the energy mitigating material may absorb greater than about 1000% more energy in the secondary energy mitigation region than in the initial energy mitigation region. In further embodiments, an energy mitigating material may absorb energy predominately in the initial energy mitigation region A, and exhibit little, if any, energy absorption in the secondary energy mitigation region B. In some embodiments, the energy absorbed in the initial energy mitigating region A should be large enough to mitigate at least a portion of the blast energy.

Depending on the amount of energy to be mitigated, the compressive strength of the energy mitigating material is a factor that may be considered. At some point in the secondary energy mitigation region, the material will exhibit a maximum compressive strength value C which represents the compressive strength of the energy mitigating material. In some embodiments, the non-confined compressive strength of the energy mitigating material may have a value ranging from about 200 p.s.i. to about 18,000 p.s.i.

In some embodiments, the energy mitigating material may be a porous material having substantially uniform pore sizes and a relatively uniform distribution of pores. In those embodiments, the energy mitigating material may be a foam material. In certain embodiments, the foam may be a carbon foam or polymer foam. Carbon foams may be produced from carbonizing polymeric foams such as phenolic foams, or carbonizing resinous foams. Further, carbon foams may be produced by the foaming of, particulate coal, coal tar pitch, coal extracts, hydrogenated coal extracts, refined pitches, mesophase pitch, petroleum pitch, and the like. Some embodiments of the energy mitigating material may have a carbon content above about 25% by weight. Further, the energy mitigating material may have a carbon content ranging from about 50% to about 100% by weight. In still other embodiments, the energy mitigating material may have a carbon content ranging from about 75% to about 100% by weight. In some embodiments, the energy mitigating material may comprise a carbon foam, having a density ranging from about 0.05 g/cc to about 1 g/cc. Other embodiments may include an energy mitigating material comprising a porous carbon, a porous graphite, or high density carbon foam, and other similar carbonaceous materials having a density greater than about 1 g/cc. In some embodiments, the material for the energy mitigating units may comprise polymer foam. Polymer foams may include, but are not limited to, phenolic foam, polystyrene foam, polyacrylonitrile foam, polyurea foam, polyethylene foam, polypropylene foams, and other similar polymeric foam materials.

Figure 4:
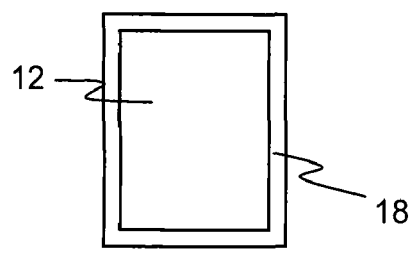
FIG. 4 is a diagrammatic view of an embodiment of an energy mitigating unit.

The energy mitigating units may further comprise reinforcements or additives in addition to the energy mitigating material. For example, as shown in FIG. 4, the energy mitigating unit 12 may have one or more surfaces coated with one or more layers of a surface coating 18. The surface coating 18 may include polymers or resins different from that used in the energy mitigating matrix which will be described below. For example, the surface coating covering one or more surfaces of the energy mitigating units may-comprise one or more of materials such as, but not limited to, metals, ceramics, glass, pyrolytic carbon, polyurethane, polyurea, semi-rigid polyurethane, polypropylene, resins, silicone, nylon, latex, rubber, other similar elastomeric materials, epoxy, acrylics, polycarbonates, phenolic resins, furfural resins, or other similar polymeric materials. Additionally, the surface coatings may be or include a layer of textile materials, including fibers and cloths, comprising materials such as, but not limited to, carbon fibers, Kevlar fibers, aramid fibers, ceramic fibers, synthetic or naturally occurring organic fibers, synthetic wires, and metal wires. The fibers may be continuous fibers, non-continuous fibers, or chopped fibers, and may have defined orientations or random orientations. Further, the energy mitigating material comprising the energy mitigating unit may incorporate additives such as, but not limited to, particulates or fibers, to enhance the energy mitigating capabilities of the energy mitigating material.

The shape of the energy mitigating units is not particularly limited and may include a wide range of shapes. In FIG. 1, the energy mitigating units have a cross-sectional shape that is approximately square. Other cross-sectional shapes include, but are not limited to triangular, circular, oval, cross-shaped, rectangular, pentagonal, hexagonal, heptagonal, octagonal, and other regular or irregular polygonal cross-sectional shapes. The energy mitigating units may also take the shape of more complex three dimensional shapes, including but not limited to, spherical, semi-spherical, cubical, pyramidal, tetrahedral, octahedral, icosohedral, cylindrical, semi-cylindrical, combinations thereof, and other three dimensional geometric shapes.

The size of the energy mitigating units is not particularly limited and may vary. The energy mitigating units are sized such that when they are used in the composite, the energy mitigating units are able to mitigate portions of the blast energy. While the size is not particularly limited and can vary depending upon the type and amount of energy to be mitigated, in some embodiments, the largest dimension of the energy mitigating unit may range from about 1/8 of an inch to about 6 inches. Some embodiments utilize energy mitigating units having a largest dimension of about 1 inch to about 2 inches. In other embodiments, the largest dimension of the energy mitigating unit may be larger than 6 inches, and in further embodiments, may range from about 6 inches to about 24 inches.

With continuing reference to FIG. 1, the energy mitigating units 12 are positioned in an energy mitigating matrix 14. In some embodiments, the individual energy mitigating units 12 may be-separated from neighboring energy mitigating units by the energy mitigating matrix 14. In other embodiments, the individual energy mitigating units may be partially separated from neighboring energy mitigating units by the energy mitigating matrix. In still other embodiments, a portion of an energy mitigating unit may be in contact with a portion of another energy mitigating unit. Still further, some embodiments may include a plurality of interconnected energy mitigating units. In some embodiments, the energy mitigating units are fully or partially confined by at least a portion of the energy mitigating matrix 14. By fully or partially confining the energy mitigating units 12 with the energy mitigating matrix 14, the capacity of the energy mitigating units 12 to mitigate the blast energy increases relative to a non-confined energy mitigating unit.

In some embodiments, the energy mitigating matrix 14 may serve to mitigate a portion of the blast energy that has not been absorbed or dissipated by the energy mitigating units 12, and in certain other embodiments, may reflect a portion of the blast stress waves to the energy mitigating units 12 for additional energy mitigation. In additional embodiments, the energy mitigating units 12 and the energy mitigating matrix 14 may work together in the blast energy mitigating composite to mitigate more blast energy interacting with the composite than would be mitigated by the individual materials alone or by themselves. In certain embodiments, the energy mitigating matrix 14 may diffuse and distribute energy through portions of the composite. In some embodiments, the energy mitigating matrix 14 holds the energy mitigating units 12 in a fixed relationship to one another.

In certain embodiments, the energy mitigating matrix may be in energy transmitting communication with the energy mitigating units such that energy may be transferred between the energy mitigating matrix and the energy mitigating units.

In some embodiments, the energy mitigating matrix is in direct physical contact with the energy mitigating units.

In some embodiments, the energy mitigating matrix 14 is made from a polymeric matrix material that has a different blast wave impedance value than that for the energy mitigating material. In some embodiments, the energy mitigating matrix 14 may be made from a polymeric matrix material that has different energy absorption characteristics than those of the energy mitigating material. In some embodiments the matrix material is able to distribute and diffuse the blast energy interacting with the composite. In certain other embodiments, the matrix material is capable of physically bonding to the energy mitigating units. A wide variety of polymer and elastomeric materials may be used as the matrix material. In some embodiments, the matrix material may include a material that can flex significantly and still largely return to its originally formed shape. A wide variety of polymers, elastomers, and resins that exhibit an elongation greater than about 100% (ASTM D638) may be used as matrix materials. In certain embodiments, the energy mitigating matrix material may exhibit an elongation from about 100% to about 600%. Further, in some embodiments, the energy mitigating matrix material may exhibit a tensile strength of about 1,000 p.s.i. or greater. In other embodiments, the energy mitigating matrix material may exhibit a tensile strength ranging from about 1,000 p.s.i. to about 4,000 p.s.i. In various embodiments the energy mitigating matrix material may exhibit an elongation from about 100% to about 600% in combination with a tensile strength ranging from about 1,000 p.s.i. to about 4,000 p.s.i. For example, FX-645 polyurea (available from Fox Industries, Baltimore, Md.) exhibits an elongation of about 450% and a tensile strength greater than about 3,200 p.s.i. For some embodiments, matrix materials, may include but are not limited to, polyurethane, semi-rigid polyurethane, polyurea, polyethylene, polypropylene, resins, silicone, nylon, latex, rubber, or other similar elastomeric materials. Other embodiments may include more rigid matrix materials. For example, other embodiments of the matrix material may include, but is not limited to, epoxy, acrylics, polycarbonates, phenolic resins, or furfural resins as the matrix material.

The energy mitigating matrix may further comprise one or more additives to the matrix material to enhance one or more properties of the matrix material. For example, the matrix reinforcement material may include a wide variety of fibers or particulates as reinforcements or additives in addition to the matrix material. For example, some embodiments may include matrix additives such as, but not limited to, fire retardants or heat reducing agents incorporated within the matrix material forming the energy mitigating matrix. In some embodiments, continuous fibers or wires may be positioned in the energy mitigating matrix and between energy mitigating units.

The blast energy mitigating composite may be formed in a wide variety of configurations. With reference to FIGS. 1 and 2, the blast energy mitigating composite has at least one layer 16a, 16b, or 16c of energy mitigating units 12 in an energy mitigating matrix 14. The number of energy mitigating units in the layer 16a, 16b, or 16c is not limited and may largely be controlled by the size of the panel 10 and the size and shape of the energy mitigating units 12. While trying to maximize the number of energy mitigating units in one of the layers 16a, 16b, or 16c, in certain embodiments there may be a portion of the energy mitigating matrix 14 between the energy mitigating units 12. In some embodiments, the distance between the energy mitigating units may have a value ranging from about 1/64 of an inch to about 3/8 of an inch. In some embodiments, the energy mitigating units are relatively equidistant from one another and provide a relatively equal amount of energy mitigating matrix material between energy mitigating units.

As shown in FIG. 2, in certain embodiment of the blast energy mitigating composite, the position of the energy mitigating units in the second layer 16b may be staggered relative to the position of the energy mitigating units in the first layer 16a. Similarly, the position of the energy mitigating units in the third layer 16c may be staggered relative to the position of the energy mitigating units in the second layer 16b. In certain embodiments, the position of the energy mitigating units in each layer is staggered relative to the energy mitigating units in adjacent layers. The energy mitigating matrix 14 may be positioned between each layer of energy mitigating units. Alternatively, in other embodiments, a layer of energy mitigating units may at least partially contact another layer of energy mitigating units or in some embodiments be interconnected with one another.

The spacing between layers may vary widely based on such factors as the amount of blast energy to be mitigated, the size and shape of the energy mitigating units, the type of energy mitigating material, and the type of energy mitigating matrix. In certain embodiments, the spacing between layers may range from a value of 1/64 of an inch to about 3/8 of an inch. In some embodiments, the layers may be separated by a distance determined by the thickness of the polymeric material used for the energy mitigating matrix. In some embodiments, the distance between the energy mitigating units in all directions in the composite are about equal. While the layers depicted in FIG. 2 are relatively planar, the layers are not restricted to such a configuration. For example, the energy mitigating units may be configured in a close-packed or staggered arrangement in all directions through the energy mitigating matrix. For some embodiments, given any configuration for the plurality of energy mitigating units throughout the composite, a portion of the energy mitigating matrix may be positioned between the layers or energy mitigating units. The number of layers in the blast energy mitigating composite is not limited and may vary depending upon such factors as the amount of blast energy to be absorbed, the structure to be protected, the energy mitigating material, the size of the energy mitigating units, and the matrix material. In some embodiments, the number of layers is at least about 2. In other embodiments, the number of layers may range from about 1 to about 20 or more.

Further, in some embodiments, the blast energy mitigating composite may include different energy mitigating units within a layer or between layers. The energy mitigating units may differ based on size, shape, composition of the energy mitigating material, or based on properties of the energy mitigating material such as, pore sizes, density, compressive strength, or other properties. By using different energy mitigating units, a blast energy mitigating composite may be tailored for specific blast mitigation situations or applications. For example, a blast energy mitigating composite may have a first layer of energy mitigating units that are made from a material that is less dense than energy mitigating units in adjacent layers, thus producing a graded blast energy mitigating composite. Another example may include different sizes of energy mitigating units in different layers of the blast energy mitigating composite such that the size of the energy mitigating units changes from one layer to the next. Additionally, the composition of the energy mitigating matrix may vary in the blast energy mitigating composite. For example, different matrix materials may be used in different regions of the blast energy mitigating composite. Accordingly, the blast energy mitigating composite may be tailored or customized for different blast mitigation situations or applications. For example, different matrix materials may be used around different blast mitigating units either within a given layer, or between layers.

Figure 5:
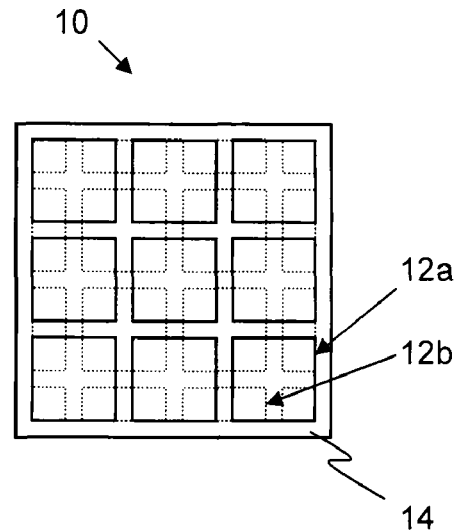
FIG. 5 is another diagrammatic view of the blast energy mitigating composite of FIG. 1.

With reference to FIG. 5, the panel 10 of FIG. 1 is illustrated showing the energy mitigating units 12b in the second layer 16b as dotted lines, relative to the position of the energy mitigating units 12a in the first layer 16a. The energy mitigating units 12a and 12b are staggered with respect to one another such that energy mitigating units in adjacent layers are not positioned directly behind one another.

Figure 6:
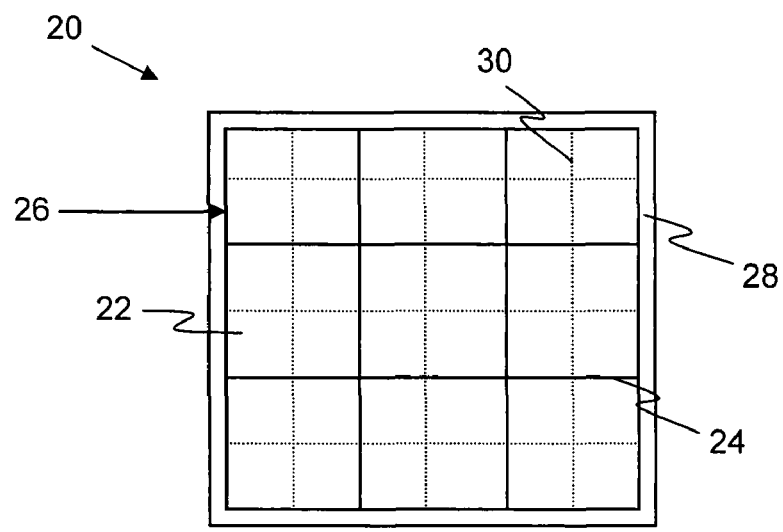
FIG. 6 is a diagrammatic view of another embodiment of a blast energy mitigating composite.
Figure 7:
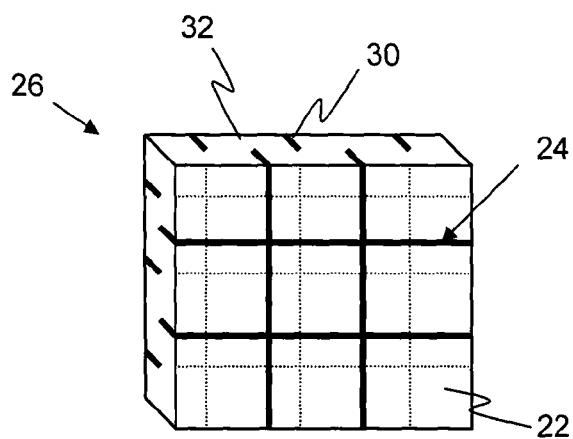
FIG. 7 is a diagrammatic view of an embodiment of a panel of energy mitigating material grooved so as to provide energy mitigating units.

FIGS. 6 and 7 illustrate another embodiment of a blast energy mitigating composite in the form of a panel 20. The panel 20 includes energy mitigating units 22 formed from a panel of energy mitigating material that has a plurality or series of grooves 24 positioned in the energy mitigating material to form a grooved panel 26 and effectively creates a plurality of interconnected energy mitigating units 22 where the panel of energy mitigating material is surrounded by the energy mitigating matrix 28. The energy mitigating matrix may cover one or more faces of the panel, including any groves on the panel. In some embodiments, the energy mitigating matrix material may be present in the groves of the panel of energy mitigating material. Further, other embodiments may include a similar set of grooves 30 in an opposing side of the energy mitigating material and are illustrated with dotted lines. The grooves 30 serve to form another set of energy mitigating units 32, illustrated in FIG. 7, on the opposing side of the energy mitigating material. In certain embodiments, the grooves are positioned such that, as discussed above, the energy mitigating units on each side of the material are not positioned directly behind one another. The smallest width of the grooves is not particularly limited. In some embodiments, the groove may be wide enough to allow portions of the matrix material to enter the groove. In some embodiments, the width of the groove may range from about $1/64$ of an inch to about $3/8$ of an inch. The width of the grooves may be uniform for all grooves or may vary from one groove to the next. In some embodiments, the width of the groove may change or be variable for the same groove.

In certain embodiments, the grooves may be oriented at angles ranging from greater than about 5° to about 90° relative to one another. In some embodiments, the spacing from one groove to the next may range from about $1/8$ of an inch up to about 6 inches. In other embodiments, the spacing of the grooves may range from about $1/4$ of an inch to about 2 inches. In still other embodiments, the spacing of the grooves may range from about $1/2$ of an inch to about 1 inch. The spacing of the grooves may be relatively uniform across the surface of the energy mitigating material layer. In other embodiments, the spacing of the grooves are not uniform, and different portions of the energy mitigating material may have a different number density of grooves. In certain embodiments, the depth of the groove may extend into the energy mitigating material a distance from about 5% to about 98% of the thickness of the energy mitigating material. For some embodiments, the groove may extend a distance from about 50% to about 95% of the thickness of the energy mitigating material. Further, the depths of the grooves may be the same for all grooves in the energy mitigating material or the depths of the grooves may be variable from one groove to the next. In some embodiments, the depth of the groove may be variable within the same groove.

In some embodiments, reinforcements may be positioned within the grooves of the energy mitigating material. For example, in some embodiments, continuous fibers, wires, or meshes may be positioned within the grooves of the energy mitigating material. In such embodiments, continuous fibers may include, but are not limited to, Kevlar, polypropylene, E-glass, S-glass, and carbon fiber. In other embodiments, wires may include, but are not limited to, aluminum, titanium, copper, steel, stainless steel, and alloys thereof. In some embodiments, meshes may include, but are not limited to, meshes formed from any of the above referenced fibers and wires.

While FIG. 5 illustrates grooves that form energy mitigating units with a square cross-sectional shape, virtually any configuration of grooves forming any variety of geometric shapes discussed above, may be utilized. The energy mitigating matrix may be any of the matrix materials discussed above. The thickness of the panel of energy mitigating material is not particularly limited and in some embodiments, may range from about $1/4$ of an inch to about 4 inches. In other embodiments, the thickness may range from about $1/4$ of an inch to about 2 inches. In further embodiments, the thickness of the panel of energy mitigating material may range from about $1/2$ of an inch to about 1 inch.

Figure 8:
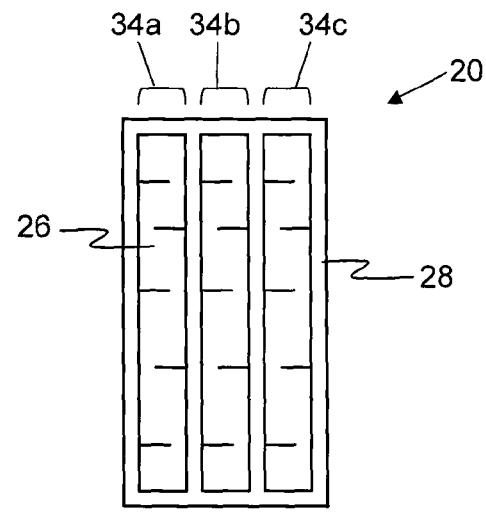
FIG. 8 is a cross-sectional diagrammatic view of the blast energy mitigating composite of FIG. 6.

Turning to FIG. 8, a blast energy mitigating composite in the form of a panel 20 utilizing grooved panels 26 as energy mitigating units may be configured such that one or more layers 34a, 34b, and 34c of grooved panels are positioned in an energy mitigating matrix 28. In some embodiments, a reinforcement layer may be provided in the energy mitigating matrix 28 near one or more grooved panels 26. In some embodiments, the grooves are large enough that the grooves are filled with the energy mitigating matrix 28. Where more than one layer of grooved panels 26 is used in the panel 20, a portion of the energy mitigating matrix 28 may be located between each layer of grooved panels as discussed above.

If desired, the blast energy mitigating composite may include one or more reinforcement layers. In some embodiments, the reinforcement layer is a layer of material that aids in distributing energy across the surface of the energy mitigating composite or layers of energy mitigating units within the composite. In certain embodiments, the material layer may be constructed from a material including, but is not limited to, plastics, metals, ceramics, wood products, manmade polymers (nylon, polypropylene, polyethylene, and other polymers), natural polymers (cellulose, cellulose based materials, silk, cotton, wool, linen, hair, and other similar natural polymers). The reinforcement layer may be in the form of one or more solid sheets, porous sheets, woven fabrics, non-woven fabrics, and meshes. In some embodiments, metals may include, but are not limited to, aluminum, titanium, stainless steel, steel, rolled homogeneous armor (RHA) steel, and alloys thereof. In other embodiments, woven fabrics may be constructed from a variety of fibers. In some embodiments, fibers may include, but are not limited to, Kevlar, polypropylene, E-glass, S-glass, and carbon fiber. In some embodiments, the reinforcement layer may comprise one or more polymer matrix composites. Polymer matrix composites may include, any of the above described fibers embedded in a polymeric matrix. In some embodiments, the polymer matrix composite may comprise a fiber reinforced polymer matrix composites where the fibers may include, but are not limited to, polymeric fibers, elastomeric fibers, metal fibers, ceramic fibers, Kevlar fibers, polypropylene fibers, E-glass fibers, S-glass fibers, carbon fibers, and combinations thereof.

The reinforcement layer may be positioned as a layer within the blast energy mitigating composite or on a surface of the blast energy mitigating composite. In some embodiments, the reinforcement layer may be positioned between layers of blast energy mitigating units or panels. When several layers of energy mitigating units or panels are provided in a composite, a reinforcement layer may be positioned between one or more of the layers of energy mitigating units or panels, as desired. The reinforcement layer may be positioned adjacent to the energy mitigating units or may be spaced a distance from the energy mitigating units. In certain embodiments the reinforcement layer is embedded in the energy mitigating matrix. In other embodiments the reinforcement layer may be applied by use of an adhesive or resin to any desired surface of the energy mitigating composite. If the reinforcement layer is embedded in the energy mitigating matrix, the reinforcement layer should be constructed of a material that is chemically compatible with the energy mitigating matrix.

Figure 9:
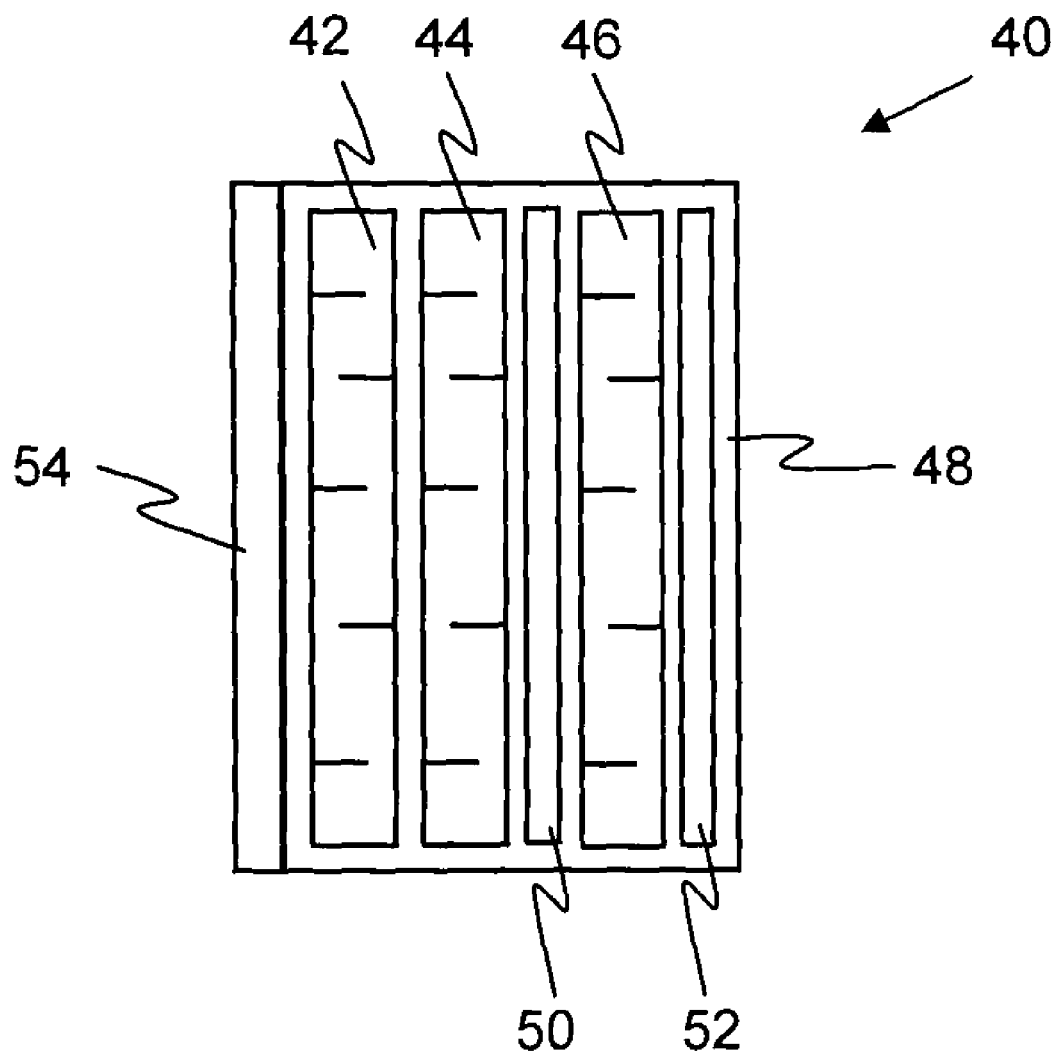
FIG. 9 is a diagrammatic view of yet another embodiment of a blast energy mitigating composite.

Turning now to FIG. 9, there is illustrated an embodiment of a blast energy mitigating composite 40 illustrating several positions for a reinforcement layer. The blast energy mitigating composite 40 includes a plurality of layers of energy mitigating units. In this embodiment, the layers of energy mitigating units are in the form of grooved panels 42, 44, and 46 of energy mitigating material. The grooved panels 42, 44, and 46 are embedded in an energy mitigating matrix 48. One or more reinforcement layers may be positioned within or on the energy mitigating composite. Reinforcement layer 50 is illustrated as being positioned between two grooved panels 44 and 46. Additionally or alternatively, reinforcement layer 52 may be positioned within the energy mitigating matrix 48 and near a grooved panel 46 which is near a surface of the energy mitigating composite. Still further, a reinforcement layer 54 may be adhered to, or otherwise affixed to a surface of the energy mitigating composite 40.

Figure 10:
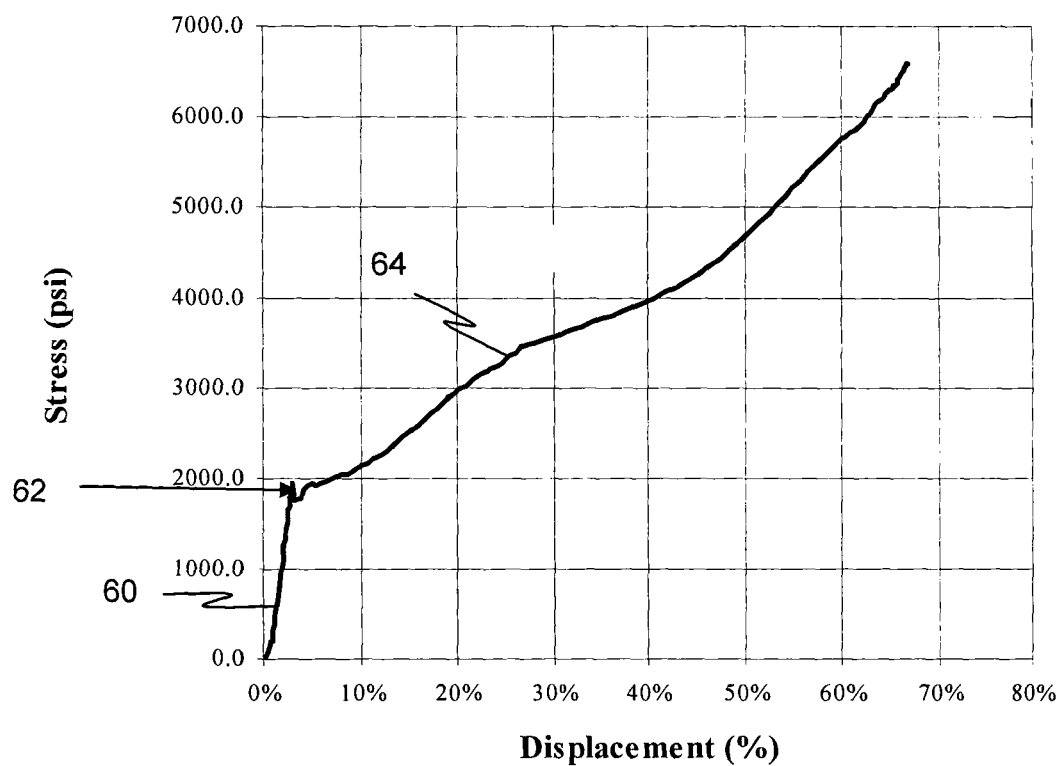
FIG. 10 is a is a stress-displacement plot showing the results of a non-confined compressive strength test for a blast energy mitigating composite in accordance an embodiment of the invention.

In some embodiments, the blast energy mitigating composite is a composite that is able to mitigating a significant amount of blast wave energy as the composite begins to physically fail. In certain embodiments, a blast energy mitigating composite may be able to absorb increasing compressive loads after the composite begins to fail during a non-confined stress-displacement test (ASTM C365). For example, FIG. 10 illustrates a stress-displacement curve for a blast energy mitigating composite in accordance with an embodiment of the invention. In FIG. 10, there is an initial portion 60 of the stress-displacement curve that is relatively linear up to a point at which the composite begins to fail 62. As illustrated in FIG. 10, the composite may be able to absorb increasing compressive loads after the point of initial failure 62 along a second portion 64 of the stress-displacement curve. In other embodiments, the second portion 64 of the stress-displacement curve may be about level representing no significant increase in compressive loads beyond the point of initial failure 62. In still other embodiments, the second portion 64 of the stress-displacement curve may be decreasing, or have a negative slope, representing lower compressive loads beyond the point of initial failure 62. While the second portion 64 of the stress-displacement curve may decrease or have a negative slope, the area under the second portion 64 of the stress-displacement curve should not be zero and in certain embodiments, this area may be at least as great as the area under the initial portion 60 of the stress-displacement curve.

Figure 11:
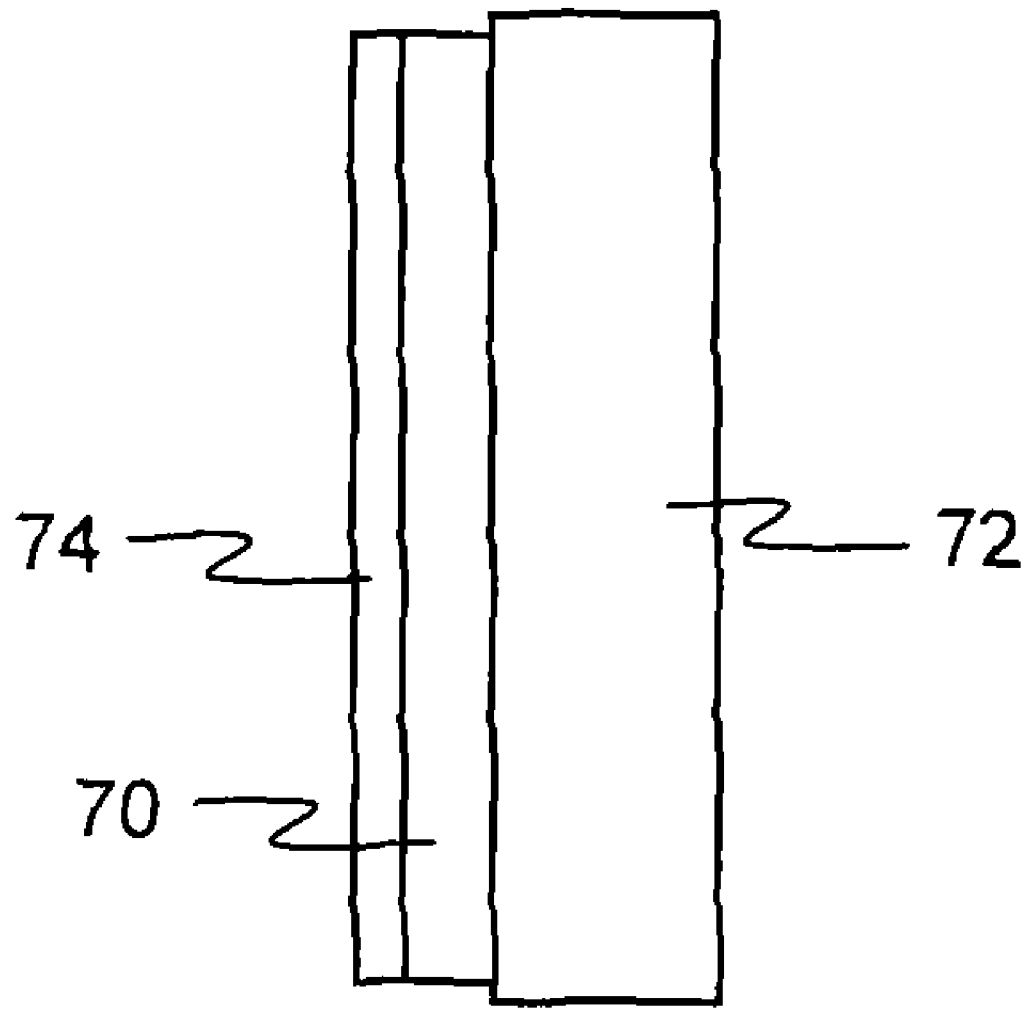
FIG. 11 is a cross-sectional diagrammatic view of an embodiment of a blast energy mitigating composite on a surface to be protected.

Still further, as illustrated in FIG. 11, the blast energy mitigating composite 70 may also include a strike face 74 attached to one or more surfaces of the energy mitigating composite. The strike face 74 is a material that when contacted with blast energy, may help distribute the blast energy over the surface of the blast energy mitigating composite. This may be particularly useful as the distance between the blast energy mitigating composite and the point of origin of the blast energy decreases. The strike face 74 may include materials such as fiber reinforced polymer composites, fiber reinforced metal matrix composites, steel, stainless steel, rolled homogeneous armor (RI-IA) steel, aluminum, ceramics, ceramic composites, and fiber reinforced ceramic composites. The strike face 74, if utilized, may be attached by fasteners such as clips, bolts, pins, and other similar fasteners. Alternatively, the strike face 74 may be adhered to the surface of the energy mitigating composite using an adhesive capable of holding the strike face on the surface of the energy mitigating composite. The adhesive may vary depending upon the materials used for the strike face and the energy mitigating composite.

While the above descriptions have illustrated a blast energy mitigating composite having a relatively square or rectangular cross-sectional shape, the shape of the composite is not limited and can take any of a variety of shapes. Some shapes may include other cross-sectional shapes, including but not limited to, triangular, circular, oval, square, rectangular, pentagonal, hexagonal, heptagonal, octagonal, and other regular and irregular polygonal cross-sectional shapes. The blast energy mitigating composite may also take the shape of more complex three dimensional shapes, including but not limited to, spherical, cubical, tetrahedral, octahedral, icosahedral, cylindrical, and other three dimensional geometric shapes.

The amount of blast energy mitigated is dependent on the design of the blast energy mitigating composite, the properties of the energy mitigating material, the properties of the energy mitigating matrix, the properties of the reinforcement layer and strike face (if utilized), and the magnitude of the blast energy interacting with the blast energy mitigating composite. In some embodiments, the blast energy mitigating composite may mitigate at least half the energy interacting with the blast energy mitigating composite. In certain other embodiments, the blast energy mitigating composite may mitigate at least 70% of the explosive energy interacting with the blast energy mitigating composite. In other embodiments, the composite may mitigate from about 60 to about 90% or more of the blast energy interacting with the blast energy mitigating composite.

Blast energy mitigating composites may be placed or secured on or near surfaces that are desirous of being protected from blast energy. FIG. 11 illustrates a blast energy mitigating composite in the form of a panel 70 on a surface 72 to be protected. Rooms, boxes, vehicles, boats, airplanes, trains, cars, are just a few of the many examples of items having surfaces for placing a blast energy mitigating composite. One or more blast energy mitigating composites may be assembled to form a blast energy mitigating structure.

The blast energy mitigating composite may be prepared by a variety of methods, including, but not limited to molding, vacuum assisted resin transfer techniques, and other composite forming techniques known to those skilled in the art. In some embodiments, a mold for the composite is prepared according to the desired shape and dimensions of the desired blast energy mitigating composite. An amount of the matrix material to form the energy mitigating matrix is placed in the mold. A layer of energy mitigating units is positioned on the matrix material followed by another layer of matrix material. These steps are repeated until the desired number of layers of energy mitigating units are reached or until the desired dimensions of the composite is reached. The matrix material is allowed cure, post-cure, heat treat, cross-link, set, solidify, or the like to form the desired energy mitigating matrix.

EXAMPLES

Blast Energy Mitigating Composite A

A rectangular, 2 inch thick, blast energy mitigating composite panel was tested to determine its ability to absorb blast energy. This panel was comprised of three rectangular carbon foam sub-panels. Two of the three sub-panels were comprised of CFOAM 17 (Touchstone Research Laboratory, Ltd., Triadelphia W. Va.). The remaining sub-panel was comprised of CFOAM 25 (Touchstone Research Laboratory, Ltd.). The orientation of the sub-panels in the blast energy mitigating composite from front to back was a CFOAM 17 sub-panel, followed by the other CFOAM 17 sub-panel, followed by the CFOAM 25 sub-panel. The three carbon foam sub-panels were encapsulated in a matrix of polyurethane to provide the blast energy mitigating composite panel.

The carbon foam sub-panels of the blast energy mitigating composite panel were of essentially equivalent size with a thickness of about ⅝ inch. Each of the sub-panels had a series of intersecting groves defining a cross-hatch pattern on both of the sub-panel major faces and extending to the limits of those faces. These grooves were approximately ½ inch deep with a ⅛ inch grove width. For each sub-panel, groves were orientated parallel to the x axis of one of the sub-panel major faces with a spacing of ¾ inch along the y axis. On the same sub-panel major face, approximately ½ inch deep and ⅛ inch wide groves orientated parallel to the y axis were spaced at ¾ inch intervals along the x axis. For a given sub-panel, the grove pattern on opposite major faces were off-set by ⅜ inch along both the x and y axis.

Testing of the blast energy mitigating composite panel was conducted by first contacting the back of the composite panel with a 0.375 inch thick steel "witness" plate. This steel "witness" plate was fixed to a rigid support such that it covered a 2 inch diameter hole in the rigid support and that the blast energy mitigating composite panel was approximately centered over the hole. Once the witness plate and energy mitigating composite panel were in place, a 5 pound charge of C4 explosive was detonated 9 inches from the front of the blast energy mitigating composite panel. Instrumentation connected to the "witness" plate, through the 2 inch diameter hole in the rigid support, provided measurement of the strain transmitted to the rigid support through the witness plate. It was determined that the blast energy mitigating composite panel absorbed 83% of the blast energy transported by the shock waves contacting the blasé energy mitigating composite panel in the "open space" test environment.

Blast Energy Mitigating Composite B

Another blast energy mitigating composite B was constructed similar to blast energy mitigating composite panel A except that the matrix was constructed from epoxy. The testing parameters were the same. The blast energy mitigating composite B absorbed about 70% of the blast energy transported by the shock waves contacting the blast energy mitigating composite pane generated from a 5 pound charge of C4 explosive.

Blast Energy Mitigating Composite C

A blast energy mitigating composite was prepared using carbon foam as the blast energy mitigating material and polyurea as the blast energy mitigating matrix. Three ½ inch carbon foam panels having a density of about 0.45 g/cc, and having horizontal and vertical grooves of about ⅛ inch wide and about ¼ inch deep spaced about 1 inch apart to form approximately 1 inch squares on each side of the panels were prepared. The grooves were cut such that the approximately 1 inch squares on each side of the panel were staggered relative to one another. FX-645 polyurea (available from Fox Industries) was used to cover the three carbon foam panels and used between each carbon foam panel. The distance between each carbon foam panel was about 1/16". A 0.157 inch thick RHA steel plate strike face was affixed to a surface of the blast energy mitigating composite. 2.5 lbs of C4 was detonated 3 inches away from the composite. A witness plate positioned behind the composite exhibited a deformation of about 1.65 inches, while the witness plate without the composite exhibited a deformation of about 3.19 inches. The blast energy mitigating composite was able to reduce the amount of blast energy observed by a witness plate relative to the witness plate without the blast energy mitigating composite.

What is claimed is:

1. A blast energy mitigating composite, comprising:
    an energy mitigating matrix comprised of a polymeric matrix material, wherein the polymer matrix material exhibits an elongation of greater than about 100% and exhibits a tensile strength of at least about 1,000 p.s.i.; and
    a plurality of energy mitigating units confined by the energy mitigating matrix, wherein the energy mitigating units comprise a porous energy mitigating material having a carbon content of at least about 25% by weight.

2. The blast energy mitigating composite of claim 1, wherein the porous energy mitigating material has a carbon content ranging from about 50% to about 100% by weight.

3. The blast energy mitigating composite of claim 1, wherein the porous energy mitigating material exhibits relatively uniform pores sizes, and wherein said pore sizes may range from about 50 μm to about 2 mm.

4. The blast energy mitigating composite of claim 1, further comprising a reinforcement layer contacting the energy mitigating matrix and near the plurality of energy mitigating units.

5. The blast energy mitigating composite of claim 4, wherein the reinforcement layer comprises a polymer matrix composite.

6. The blast energy mitigating composite of claim 5, wherein the polymer matrix composite is a fiber reinforced composite comprising fibers select from the group consisting of polymeric fibers, elastomeric fibers, metal fibers, ceramic fibers, Kevlar fibers, polypropylene fibers, E-glass fibers, S-glass fibers, carbon fibers, and combinations thereof.

7. The blast energy mitigating composite of claim 4, wherein the reinforcement layer comprises a material selected from the group consisting of, aluminum, titanium, stainless steel, steel, rolled homogeneous armor (RHA) steel.

8. The blast energy mitigating composite of claim 1, wherein the porous energy mitigating material has a compressive strength ranging from about 200 p.s.i. to about 18,000 p.s.i.

9. The blast energy mitigating composite of claim 1, wherein the porous energy mitigating material is a carbon foam.

10. The blast energy mitigating composite of claim 1, wherein the porous energy mitigating material is a polymer foam.

11. The blast energy mitigating composite of claim 1, wherein the porous energy mitigating material is a carbon foam having a density ranging from about 0.05 g/cc to about 1 g/cc.

12. The blast energy mitigating composite of claim 1, wherein the energy mitigating units have a surface coating on at least one surface of the energy mitigating units.

13. The blast energy mitigating composite of claim 12, wherein the surface coating comprises a layer of textile material.

14. The blast energy mitigating composite of claim 1, wherein the energy mitigating units have a cross-sectional shape of triangular, circular, oval, cross-shaped, rectangular, pentagonal, hexagonal, heptagonal, or octagonal.

15. The blast energy mitigating composite of claim 1, wherein the energy mitigating units have a shape of spherical, semi-spherical, cubical, pyramidal, tetrahedral, octahedral, icosohedral, cylindrical, or semi-cylindrical.

16. The blast energy mitigating composite of claim 1, wherein the energy mitigating units have a size ranging from about ⅛ of an inch to about 6 inches.

17. The blast energy mitigating composite of claim 1, further comprising at least two layers of energy mitigating units.

18. The blast energy mitigating composite of claim 4, further comprising at least two layer of energy mitigating units and wherein the reinforcement layer is positioned between the at least two layers of energy mitigating units.

19. The blast energy mitigating composite of claim 1, wherein the polymeric matrix material is selected from the group consisting of polyurethane, semi-rigid polyurethane, polyurea, polyethylene, polypropylene, resins, silicone, nylon, latex, and rubber.

20. The blast energy mitigating composite of claim 1, further comprising at least two layers of energy mitigating units, wherein the position of the energy mitigating units in each layer are staggered relative to energy mitigating units in adjacent layers.

21. The blast energy mitigating composite of claim 1, further comprising at least two layers of energy mitigating units, wherein the position of the energy mitigating units in each layer are staggered relative to the position of the energy mitigating units in adjacent layers, wherein the energy mitigating units have a size ranging from about ⅛ of an inch to about 6 inches, and wherein the porous energy mitigating material is a carbon foam having a density ranging from about 0.1 g/cc to about 1 g/cc.

22. The blast energy mitigating composite of claim 21, wherein the matrix material is polyurea.

23. The blast energy mitigating composite of claim 4, wherein the reinforcement layer is embedded within the energy mitigating matrix.

24. The blast energy mitigating composite of claim 4, wherein the reinforcement layer is affixed to a surface of the energy mitigating matrix.

25. A blast energy mitigating composite, comprising:
at least one grooved panel, wherein the grooved panel comprises a porous energy mitigating material and wherein grooves in the panel define a plurality of energy mitigating units; and
an energy mitigating matrix surrounding the at least one grooved panel, wherein the energy mitigating matrix comprises a polymeric matrix material that exhibits an elongation of greater than about 100% and exhibits a tensile strength of at least about 1,000 p.s.i.

26. The blast energy mitigating composite of claim 25, wherein the porous energy mitigating material exhibits relatively uniform pores sizes, and wherein said pore sizes may range from about 50 μm to about 2 mm.

27. The blast energy mitigating composite of claim 25, further comprising a reinforcement layer contacting the energy mitigating matrix and near the at least one grooved panel.

28. The blast energy mitigating composite of claim 27, wherein the energy mitigating reinforcement layer comprises a polymer matrix composite.

29. The blast energy mitigating composite of claim 28, wherein the polymer matrix composite is a fiber reinforced composite comprising fibers select from the group consisting of polymeric fibers, elastomeric fibers, metal fibers, ceramic fibers, Kevlar fibers, polypropylene fibers, E-glass fibers, S-glass fibers, carbon fibers, and combinations thereof.

30. The blast energy mitigating composite of claim 27, wherein the energy mitigating reinforcement layer comprises a material selected from the group consisting of, aluminum, titanium, stainless steel, steel, rolled homogeneous armor (RHA) steel.

31. The blast energy mitigating composite of claim 25, wherein the porous energy mitigating material has a compressive strength ranging from about 200 p.s.i. to about 18,000 p.s.i.

32. The blast energy mitigating composite of claim 25, wherein the porous energy mitigating material is a carbon foam.

33. The blast energy mitigating composite of claim 25, wherein the porous energy mitigating material is a polymer foam.

34. The blast energy mitigating composite of claim 25, wherein the porous energy mitigating material is a carbon foam having a density ranging from about 0.1 g/cc to about 1 g/cc.

35. The blast energy mitigating composite of claim 25, wherein the energy mitigating units have a surface coating on at least one surface of the energy mitigating units.

36. The blast energy mitigating composite of claim 35, wherein the surface coating comprises a layer of textile material.

37. The blast energy mitigating composite of claim 25, wherein the energy mitigating units have a cross-sectional shape of triangular, circular, oval, cross-shaped, rectangular, pentagonal, hexagonal, heptagonal, or octagonal.

38. The blast energy mitigating composite of claim 25, wherein the energy mitigating units have a size ranging from about ⅛ of an inch to about 6 inches.

39. The blast energy mitigating composite of claim 25, wherein the energy mitigating units have a size ranging from about ½ of an inch to about 2 inches.

40. The blast energy mitigating composite of claim 25, wherein the polymeric matrix material is selected from the group consisting of semi-rigid polyurethane, polyurethane, polyurea, polyethylene, polypropylene, resins, silicone, nylon, latex, or rubber.

41. The blast energy mitigating composite of claim 25, wherein the grooves have a depth ranging from about ¼ about ¾ of the thickness of the panel.

42. The blast energy mitigating composite of claim 25, further comprising at least two grooved panels.

43. The blast energy mitigating composite of claim 27, further comprising at least two grooved panels, and wherein the reinforcement layer is positioned between the at least two grooved panels.

44. The blast energy mitigating composite of claim 25, further comprising at least two panels, wherein the position of the energy mitigating units in each panel are staggered relative to the position of the energy mitigating units in adjacent panels, wherein the energy mitigating units have a size ranging from about ⅛ of an inch to about 6 inches, and wherein the porous energy mitigating material is a carbon foam having a density ranging from about 0.1 g/cc to about 1 g/cc.

45. The blast energy mitigating composite of claim 44, wherein the matrix material is polyurea.

46. The blast energy mitigating composite of claim 27, wherein the reinforcement layer is embedded within the energy mitigating matrix.

47. The blast energy mitigating composite of claim 27, wherein the reinforcement layer is affixed to a surface of the energy mitigating matrix.

48. The blast energy mitigating composite of claim 25, wherein the grooves have a depth ranging from about 5% to about 98% of the thickness of the grooved panel.

* * * * *